(12) United States Patent
Jaeger

(10) Patent No.: US 6,941,191 B2
(45) Date of Patent: Sep. 6, 2005

(54) ROBOT INTELLIGENCE IN NATURAL ENVIRONMENTS

(75) Inventor: Markus Jaeger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 10/678,262

(22) Filed: Oct. 6, 2003

(65) Prior Publication Data

US 2004/0068348 A1 Apr. 8, 2004

Related U.S. Application Data

(63) Continuation of application No. PCT/DE02/01174, filed on Apr. 2, 2002.

(30) Foreign Application Priority Data

Apr. 5, 2001 (DE) .......................... 101 17 016

(51) Int. Cl.[7] ............................. G06F 19/00
(52) U.S. Cl. ................. 700/245; 700/250; 700/257; 700/258; 700/259; 700/264; 318/568.11; 318/568.12; 318/568.13; 318/568.16; 318/568.21; 318/587; 701/1; 701/120; 701/123; 701/200; 701/207; 701/215; 701/3; 701/23; 701/24; 701/25; 701/26; 701/300; 701/301; 901/47
(58) Field of Search ................... 700/245, 250, 700/253, 257–259, 264; 701/1, 3, 23–26, 120, 123, 200, 207, 215, 300–301; 901/47

(56) References Cited

U.S. PATENT DOCUMENTS

| | | | | |
|---|---|---|---|---|
| 6,374,155 B1 | * | 4/2002 | Wallach et al. | 700/245 |
| 6,496,755 B2 | * | 12/2002 | Wallach et al. | 700/245 |
| 6,539,284 B2 | * | 3/2003 | Nourbakhsh et al. | 700/245 |
| 6,580,909 B1 | * | 6/2003 | Carro | 455/450 |
| 6,625,540 B2 | * | 9/2003 | Kageyama | 701/301 |
| 6,687,571 B1 | * | 2/2004 | Byrne et al. | 700/245 |
| 6,760,647 B2 | * | 7/2004 | Nourbakhsh et al. | 700/245 |
| 6,836,701 B2 | * | 12/2004 | McKee | 700/245 |
| 2002/0165649 A1 | * | 11/2002 | Rekow et al. | 701/26 |

OTHER PUBLICATIONS

Zhang et al., Fuzzy logic in collective robotic search, 2003, IEEE, pp. 1471–1475.*
Martins et al., Coordinated maneuver for gradient search using multiple AUVs, 2003, Internet, pp. 347–325.*

* cited by examiner

Primary Examiner—Thomas G. Black
Assistant Examiner—McDieunel Marc
(74) Attorney, Agent, or Firm—Sughrue Mion, PLLC

(57) ABSTRACT

A method for automatic, decentralized coordination of the movement paths of mobile robots in order to prevent collisions and to detect and resolve mutual blockings. According to the method, a robot receives position information from other robots and establishes a coordinating connection with another robot if the position falls below a minimum allowable distance. One of the robots is then chosen as coordinator and the other robot is chosen as partner. The coordinator initiates an algorithm for the prevention of collisions, wherein a time sequence diagram is determined for the motion path segments of the coordinator and the partner. A robot for detecting robots that are mutually blocking one another in a circuit initiates an algorithm for detecting blocking if the robot has not been given authorization to execute its next motion path segment. An algorithm for resolving the blocking is initiated if robots mutually blocking each other in a circuit are detected by the detecting robot. The algorithm includes a first step and optionally a second step, whereby the sequence for the execution of the next motion path segment of the robots is interchanged during a coordinating connection and the motion paths of one or more robots mutually blocking each other in a circuit are newly planned.

10 Claims, 4 Drawing Sheets

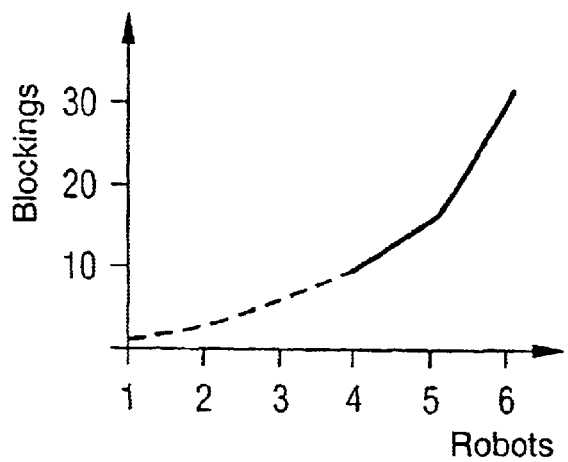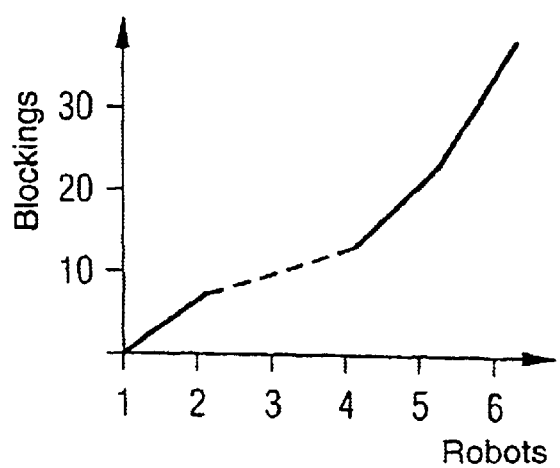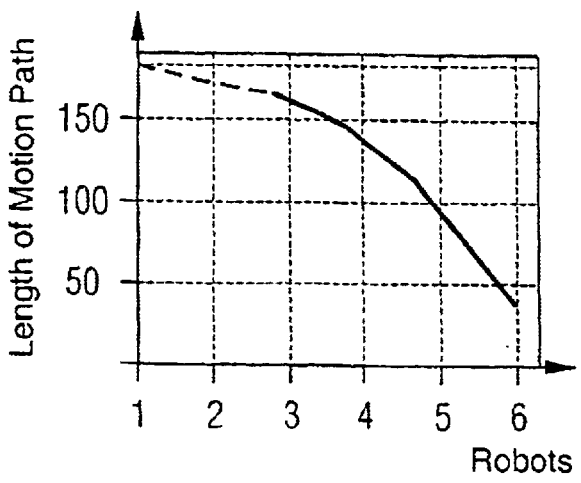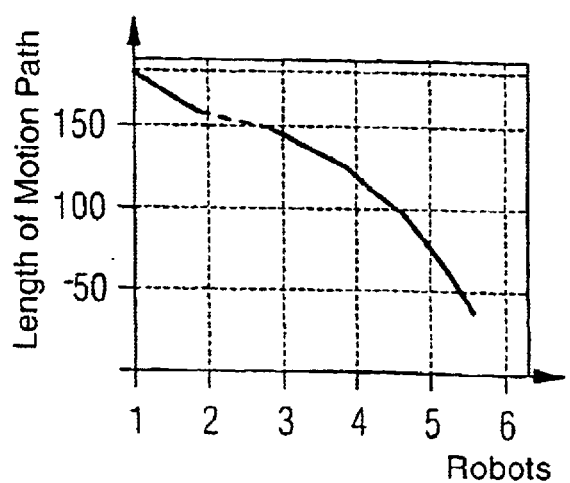

ROBOT INTELLIGENCE IN NATURAL ENVIRONMENTS

This is a Continuation of International Application PCT/DE02/01174, with an international filing date of Apr. 2, 2002, which was published under PCT Article 21(2) in German, and the disclosure of which is incorporated into this application by reference.

FIELD OF AND BACKGROUND OF THE INVENTION

The present invention is directed to coordination of the independent motion paths of robots in a working environment used by these robots. In particular it relates to a method of automatic, decentralized coordination of the independent motion paths which can be broken down into segments of a plurality of mobile robots communicating with each other within a specified geographical area, to avoid collisions and to detect and resolve mutual blocking.

When a number of mobile robots share the same working environment account must be taken of the fact that the robots might collide with each other. The danger of a collision generally increases with the number of robots used. To avoid collisions, the motion paths of the individual robots must be coordinated.

Methods of avoiding collisions between robots, in general, are known.

A method in which it is possible to dispense with a communications network between the robots provides for the introduction of traffic rules for example by which collisions are avoided if the rules are observed by all robots. The disadvantage of this method is however that very specific assumptions must then be made about the working environment. This type of method is described, e.g., in S. Kato, s. Nishiyama and J. Takeno "Coordinating Mobile Robots by Applying Traffic Rules", International Conference on Intelligent Robots and Systems (IRQS), pp. 1535–1541, 1992.

In another method in which a communications network between the robots can also be dispensed with, the robots are equipped with sensors which can detect other robots within a specific area. Whenever a robot detects another robot the point at which the robots might possibly collide is computed and the motion path is modified accordingly to avoid a collision. Since however the motion paths are replanned on a local basis this can result in mutual blockings of the robots (see below) which will not be detected and resolved. This method is described for example in L. Chun, Z. Zhang and W. Chang, A Decentralized Approach to the Conflict-Free Motion Planning for Multiple Mobile Robots, "Int. Conf. on Robotics and Automation (ICRA), pp. 1544–1549, 1999.

Another approach follows procedures in which the motion paths are coordinated by means of a central component. There are basically two options available here, one of which simultaneously creates the central components for collision-free motion paths for all robots involved; the other makes it possible for independently planned motion paths of the robots only to be coordinated subsequently by using the central components. The first method is described for example in J. Barraquand, B. Langlois and J.-C. Latombe "Numerical Potential Field Techniques for Robot Path Planning, IEEE Trans. On System, Man and Cybernetics, Vol. 22(2), pp. 224–241, 1992. An example of the second method can be found in S. Leroy, J. P. Laumond and T. Simeon "Multiple Path Coordination for Mobile Robots: A Geometric Algorithm", International Joint Conference on Artificial Intelligence (IJCAI), 1999, and M. Bennewitz and W. Burgard, "Coordinating the Motions of Multiple Mobile Robots Using a Probalistic Model", 8th International Symposium on Intelligent Robotic Systems (SIRS), 2000.

The disadvantage of all these methods which use a central component for coordinating the motion paths is however that they need a global communications network between the robots. Over and above this these methods are computation-intensive and inflexible.

An easier and more adaptable coordination between the robots with a less expensive communications network could be achieved by decentralized algorithms in which there is communication only between pairs of physically adjacent robots.

OBJECTS OF THE INVENTION

An object of the present invention is thus to specify a method for decentralized coordination of the motion paths of a plurality of mobile robots communicating with each other within a specified geographical area. Another related object is to provide such a method that avoids collisions as well as detects and resolves mutual blocking. Yet another object is to avoid the disadvantages and thereby improve upon the conventional methods.

SUMMARY OF THE INVENTION

These and other objects are achieved by the features of the independent claims of the present invention. Advantageous exemplary embodiments of the invention are specified in the dependent claims.

In accordance with one formulation of the invention, a method of automatic, decentralized coordination of the independent motion paths which can be broken down into segments of a plurality of mobile robots communicating with each other within a specified geographical area, to avoid collisions and to detect and resolve mutual blocking is specified. In the method:

a robot receives positioning information from the other robots and determines its distance ($d_{rob}$) to the other robots, when a robot moves to within a specified distance ($d_{safe}$) of the other robots it sets up and maintains a coordination connection to these robots to coordinate its motion path with the motion paths of the other robots for as long as is at less than the prespecified relative distance, in which case one of the robots linked by the coordination connection is selected as coordinator and the other as partner, a coordinator requests the planned movement segments of its partner and initiates an algorithm for avoiding collisions by which the motion path segments of the partner are harmonized with its own motion path segments in order to determine the collision areas in which the robots are less that a specified minimum distance ($d_{90\ min}$) apart and in which a timing sequence scheme for the motion path segments of coordinator and partner is determined, on the basis of the timing sequence scheme for the motion path segments of coordinator and partner, a coordinator gives permission to itself and its partner to execute the next motion path segment and the motion path segment is only executed when the permission is granted, a robot initiates an algorithm to detect blocking in order to detect a group of mutually blocking robots if it has not been granted permission to execute its next motion path segment, on detection a group of mutually blocking robots by the detecting robot an algorithm to resolve the blocking is initiated comprising a first step and a second step, with the first step being that with a coordinating connection of the mutually blocking robots the sequence for executing the next motion path segment is exchanged between the robots connected by a coordination connection in each case and with the second step being that one or more of the robots belonging to a group of mutually blocking robots plan new motion paths, with the second step only being executed if the first step has not led to the blocking being resolved.

This process will now be explained in greater detail. In the method in accordance with the invention each robot is capable of communicating with all other robots and of exchanging information about the relevant location if the other robots are within a specific prespecified distance of it. Each robot evaluates the location information received from the other robots and determines the physical distance between itself and the other robots (any imprecision between the distance calculated from the location information provided by the other robots and the actual distance between the two robots should in any event be less than $\delta d$.)

When a robot determines that its distance from another robot, designated as $d_{rob}$, is less than a prespecified minimum distance designated as $d_{safe}$, minus the possible margin for error $\delta d$, $d_{rob} - \delta d < d_{safe}$ this robot initiates a coordination connection to the other robot. This coordination connection is maintained for as long as the two robots are less than a prespecified minimum distance apart. Each robot can In this case simultaneously initiate and maintain a number of coordination connections to other robots, if it is not at the prespecified minimum distance $d_{safe}$ from these robots.

The object of a coordination connection between two robots is to coordinate the motion of two robots along their motion paths in such as way that collisions between them are avoided. In practical terms in this case each motion path of a robot is broken down into a sequence of segments.

Between two robots linked by a coordination connection one will be selected as coordinator and the other as partner in each case. After one of the robots has been defined as coordinator it requests from its partner the segments of its motion path and reconciles these motion path segments with its own motion path segments. If matching time-space motion path segments of coordinator and partner are found these motion path segments are evaluated as colliding. From this information the coordinator determines a timing sequence scheme for the motion path segments of the motion paths of coordinator and partner. From this point on the coordinator grants itself and its partner the relevant permission to execute the next motion path segment of their motion path. Without such permission the next motion path segment of a motion path may not be executed. In this case permission to execute the next motion path segment is granted either to only the coordinator, or only the partner, or to both. A lack of permission for the next motion path segment thus corresponds to a wait time imposed on the robot.

BRIEF DESCRIPTION OF THE DRAWINGS

The invention will now be described in greater detail, by way of example, with reference to the embodiments depicted in the figures, in which:

FIGS. 7A and 7B are graphs showing the number of blockings versus the number of robots for the environments of FIGS. 5A and 5B, respectively; and FIGS. 8A and 8B are graphs showing the average motion path lengths versus the number of robots for the environments of FIGS. 5A and 5B, respectively.

DETAILED DESCRIPTION OF THE PREFERRED EMBODIMENTS

An advantageous embodiment of the invention provides for the timing sequence scheme for the segments of the motion paths of coordinator and partner to be determined by an algorithm based on the work of K. Kant and S. W. Zucker, "Toward Efficient Trajectory Planning: The Path Velocity Decomposition", The International Journal of Robotics Research, Vol. 5, pp. 72–89, 1989 and P. A. O'Donnell and T. Lozano-Periz, "Deadlock-Free and Collision-Free Coordination of Two robot Manipulators; Int. Conf. on Robotics and Automation (ICRA), pp. 484–489, 1998. Both of these articles are incorporated into the present application by reference.

Figure 1:
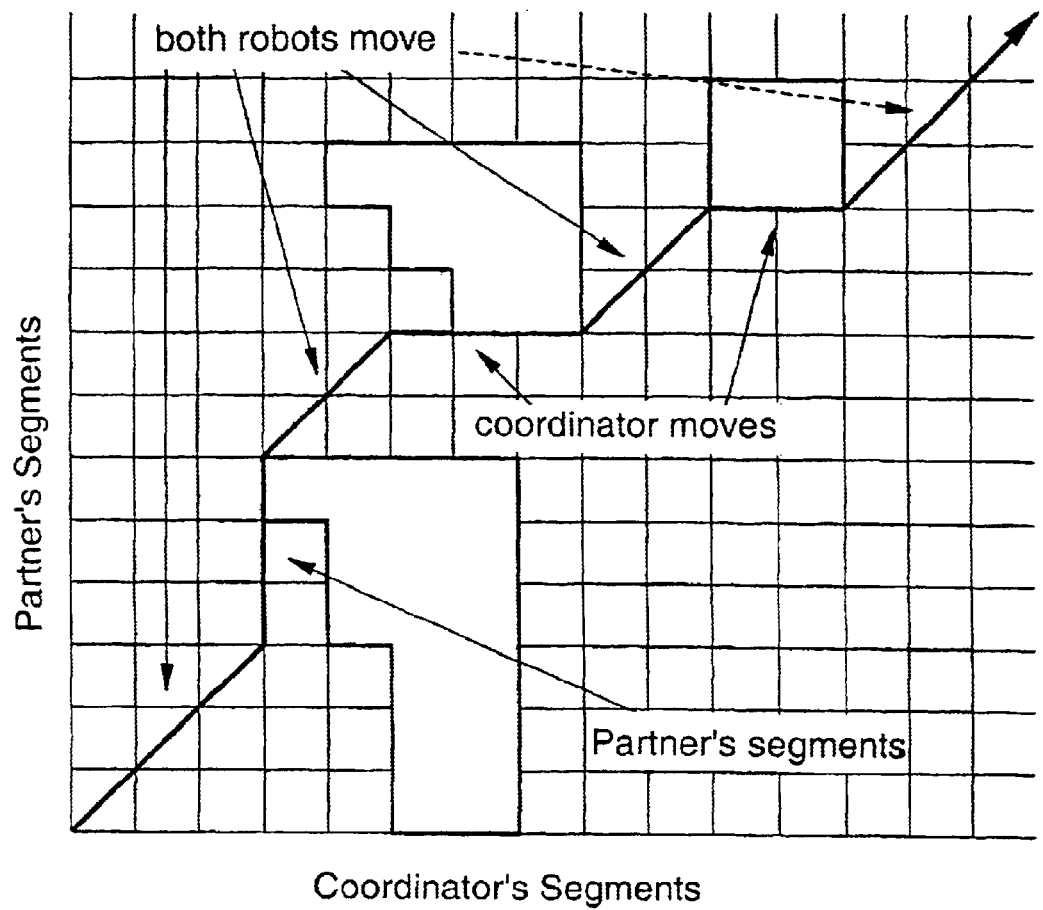
FIG. 1 shows an example of a task completion diagram.

In this case the motion path segments of a coordinator and its corresponding partner are initially made available in a two-dimensional diagram (Task Completion Diagram) with the motion path segment of the coordinator and of its partner being represented by the horizontal and vertical axis of the diagram in each case. A typical such diagram is shown in FIG. 1 The values of the motion path segments will be shown as constant, regardless of the actual execution time of the segments. The start point of the two motion paths is in the bottom left corner of the diagram, the end point of the motion paths is in the top right corner.

The colliding areas are determined by checking whether a specific segment of the coordinator and a specific segment of the partner lead to a collision, i.e. whether there are two positions of the robots in the segment which produce a distance between the robot which is less than a prespecified minimum distance d90 min. This type of collision checking must be undertaken for all combinations of the coordinator and partner segments. All colliding areas for which the collision checking has proved positive are marked. In FIG. 1 all colliding areas are highlighted in black.

After completion of the diagram an execution path is determined avoiding all marked, colliding areas, beginning with the bottom left corner and ending in the top right corner. Advantageously the shortest execution path is selected from what is generally a plurality of possible execution paths since this path causes the smallest total delay for the robot. In determining the execution path the differing execution times of the motion path segment should also have been taken into consideration.

Finally the execution path is used to determine the sequence scheme for executing the motion path segment of coordinator and partner. Starting from the bottom left corner, the path is broken down into equal sections with an entry being made in the sequence scheme for each section. For each horizontal section an entry is made signifying that the coordinator has permission to take this path; for each vertical section an entry is made signifying that the partner has permission to take this path; and for each diagonal section an entry is made signifying that both robots have permission to take this path; If permission is now granted to only one of the robots to execute its next motion path segment this means that the other robot must wait until it has executed its motion path segment. This corresponds to insertion of wait times into the motion path segment of the waiting robot.

If no execution path can be determined, i.e. there is no possible execution path, a special entry is added to the sequence scheme which specifies that no robot is given permission to execute the next segment.

Each robot can be connected to a number of other robots, both as coordinator and as partner, by a coordination connection. This results in coordination of a number of robots in a global coordination structure. Each robot must therefore have the permission of all coordination connections linked to it before it may execute its next motion path segment. In this case a situation can occur in which a number of robots have to wait for each other before they may execute their next motion path segment so that the robots are mutually blocking one another in the execution of their motion path segment. Such blockings (deadlocks) must be detected and rectified to enable the robots to continue to be used.

Since a mutual blocking can only occur when a robot must wait until another robot has executed its motion path segment, it initiates a blocking detection when it is forced to wait for another robot.

Figure 2:
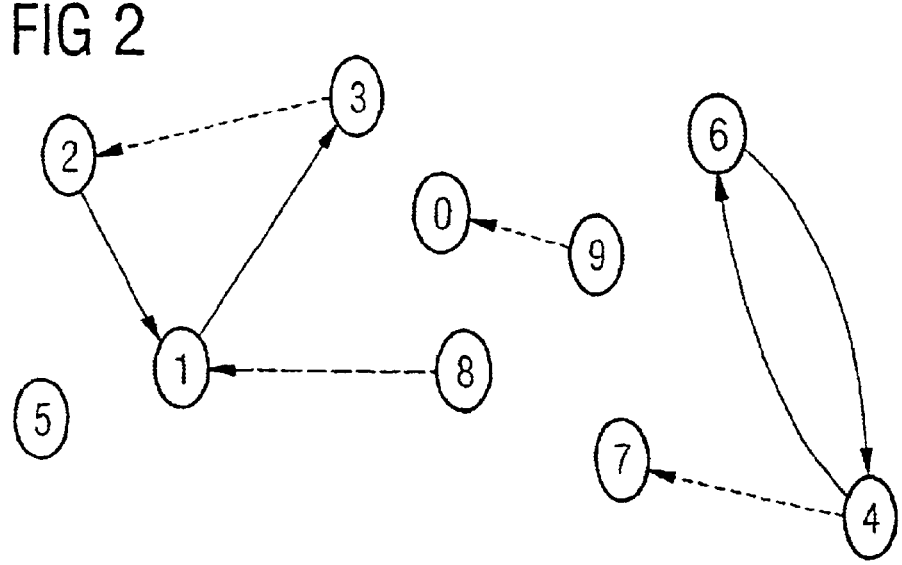
FIG. 2 shows a graphical representation of coordination connections between robots.

The coordination connections between the robots can be provided with a direction, graphically symbolized by a direction arrow, in order to indicate that a robot must wait for another robot until the latter has executed its motion segment. This type of symbolic representation is shown in FIG. 2. The nodes of the diagram correspond to the robots, the arrows connecting the robots symbolize the coordination connection, with the robot to which the tip of the arrow points having precedence for the execution of its motion path segment over the other robot from which the arrow originates. For example robot 9 must wait for robot 0 until the latter has executed its motion path segment. Robot 4 and 6 are mutually blocking each other since both must wait for each other until the other robot has executed its motion path segment. Robots 1, 2 and 3 are also mutually blocking each other. As can be seen from FIG. 2 a detection of mutual blockings can be reduced to locating closed groups along the directional coordination connections.

Preferably an algorithm is used for this which is based on the work of K. M. Chandy, J. Misra and L. M. Hass, "Distributed Deadlock Detection", ACM Trans. On Computer Systems, May 1983. This article is incorporated into the present application by reference as well. In this case for the creation of a direction for a coordination connection from the robot from which the direction arrow originates, a test message is initiated and is sent along the directed coordination connection. This test message is forwarded by all robots that receive it by their directed coordination connection. In this case an identification of each robot that has passed on the test message is flagged in the test message. When a robot finally receives a test message which it has initiated itself, a blocking is detected. The blocking can be notified immediately using the flagged identifications of the robots passed.

With this algorithm it can occur that more than one robot detects the same blocking, e.g. when two robots initiate blocking detection for the same closed group at the same time. This is of no importance however since the solution for such blockings in accordance with the invention can also handle multiple detections of the same blockings. Equally it can occur that apparent blockings are detected, i.e. blockings that have already been resolved. This can occur for example when a directed coordination connection belongs to two different blockings and this directed coordination connection has already been changed within the context of the resolution of the other group of mutually blocking robots. The algorithm in accordance with the invention for resolving blockings can however also handle apparent blockings.

If a mutual blocking of robots is detected a blocking resolution is initiated by the robot detecting it.

A resolution of a mutual blocking of robots comprises two steps, whereby the second step is only executed if the first step has not been successful.

Figure 3:
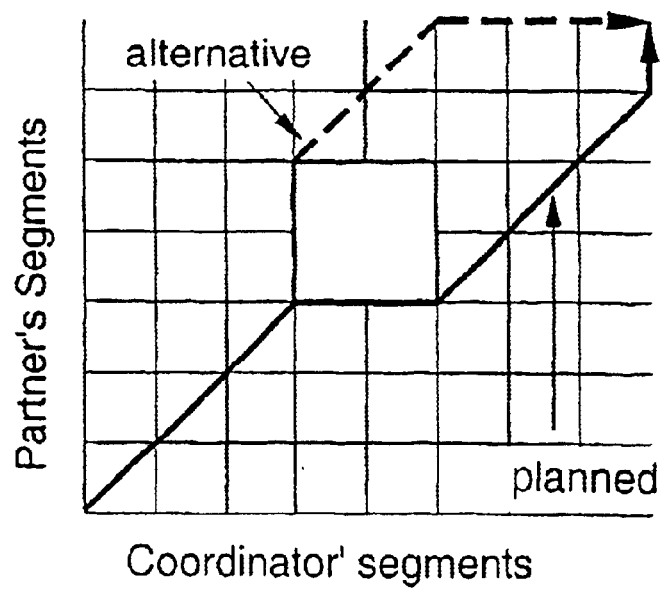
FIG. 3 shows a task completion diagram in which execution precedence is interchangeable.

The first step consists of reversing the direction of a directed coordination connection in the closed group of mutually blocking robots. Since this means that the group is no longer closed, mutual blocking is resolved. As has already been shown, the direction of a directed coordination connection specifies which robot has precedence for execution of its next motion path segment. However situations can occur in which it is not a matter of which of the two robots has precedence in moving first but merely that the two robots do not move at the same time. FIG. 3 shows a typical example of such a situation. With the collision area highlighted in black in FIG. 3 first the coordinator and then its partner can be moved to bypass it (solid line). Alternatively however the partner can be moved first and then the coordinator (dashed line). What is more, in the example shown there is no significant difference discernable in the total execution time of the two robots. In a task completion diagram a collision area in which it does not matter whether the coordinator or its partner is moved first can be found by the execution path determined meeting a collision area at its left bottom corner.

In order to now determine whether a directed coordination connection exists for which the direction can be reversed a change message is preferably sent around the closed group by the robot detecting the blocking. When a robot receives a change message it asks the coordinator of the directed coordination connection going out from it which belongs to the group whether the direction of the directed coordination connection can be changed. If the coordinator is in a position to create an alternative sequence scheme for executing the motion path segment in which for bypassing a collision area it does not matter whether the coordinator or its partner is moved first, the direction of the directed coordination connection is reversed. In addition the change message is discarded. The resolution of the mutual blocking of the robots and the algorithm to resolve the blockings is ended. If the direction of a directed coordination connection of a closed group cannot be reversed in this way the second step of the algorithm in accordance with the invention for resolving the mutual blocking of robots is performed.

The second step for resolving blockings consists of one or more robots of a blocking planning alternative motion paths. The situation in which all robots plan new motion paths at the same time should be avoided here. Rather, as with the algorithm shown here, as few robots as possible should plan a new motion path.

Planning new motion paths preferably comprises two steps which are performed iteratively until the blocking is resolved or until it is decided that the blocking cannot be resolved when only individual robots are requested to change their motion paths. The latter situation is regarded as highly unlikely in actual practice and only depends on the characteristics of the unit planning the motion path and the characteristics of the environment.

The first step includes sending a new planning message to the closed group of blocking robots, using the same procedure as used to send the change message. When a robot receives a new planning message it asks its motion path planning unit whether an alternative motion path can be planned. In this case the robot can inform its motion path planning unit about the positions of the surrounding robots, i.e. the robots to which there are coordination connections, in order to achieve better results. When a robot is able to plan an alternative motion path all outgoing directed coordination connections are removed. Since this interrupts the closed group, the blocking is thus resolved. The new planning message is then discarded. When a robot receives a new planning message which was initiated by itself however, it can be deduced from this that no robot in the group was capable of planning an alternate motion path.

When a blocking could not be resolved during the first step then it can be that it is temporarily not possible to do so. This case can arise for example if other robots in the neighborhood of a robot are preventing it from creating a new motion path. These two cases can be distinguished by the following criterion:

When none of the robots involved is capable of planning an alternate motion path and if none of the robots involved has an uninvolved robot in its neighborhood, the blocking cannot be resolved by requesting individual robots to plan alternate motion paths.

Figure 4:
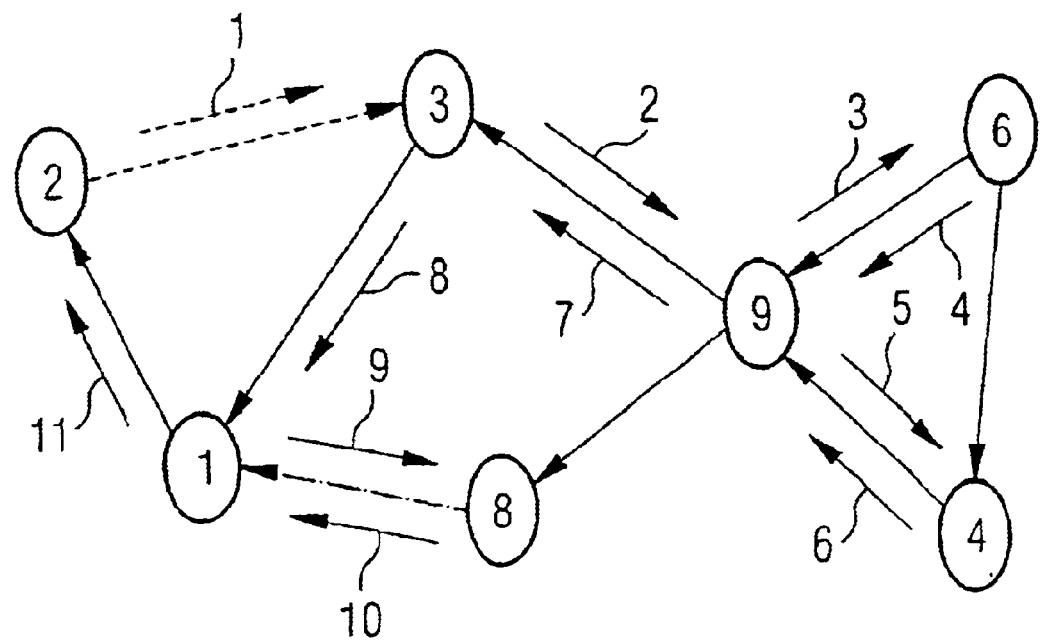
FIG. 4 shows an example of a blocked group of robots.

A robot will be regarded as involved in this case if it is part of the group or if it is assigned to the group by an outgoing coordination connection either directly or transitively FIG. 4 shows a typical blocked group of robots 1, 2 and 3 as well as a number of involved robots.

The idea of the second step for planning and alternate motion path is now to check this criterion and ask robots involved which are not part of the group whether they can plan alternate motion paths. This enables as many blocked robots as possible to be freed.

During the second step for planning an alternate motion path a freeing message is preferably sent to all robots involved. This occurs on the one hand when the freeing message is sent around the group and on the other hand by enabling the freeing message to leave the group and to cross to the robots involved using coordination connections going to them. In this case those robots which have already received the freeing message are left out. FIG. 4 illustrates the path of the freeing message initiated by robot 2, with the broken arrows indicating the direction of the group and the black solid arrows the path during the crossing over.

The freeing message is used to ask the robots which are not part of the group whether alternate motion paths can be planned and to collect information as to whether non-involved robots are still in the neighborhood. When a robot receives a freeing message which it has initiated itself it knows that all the robots involved have received the message. The robot then evaluates the criterion presented above and ends the blocking resolution when the conditions for it are fulfilled.

Should the highly unlikely event occur that no direction of a directed coordination connection can be reversed and that none of the robots involved can change its motion path all robots involved in a blocking group are informed about this. These robots then no longer take part in a procedure to detect and resolve the blocking group.

FIGS. 5 to 8 will now be used to illustrate an exemplary embodiment of the method in accordance with the invention.

Figure 5A:
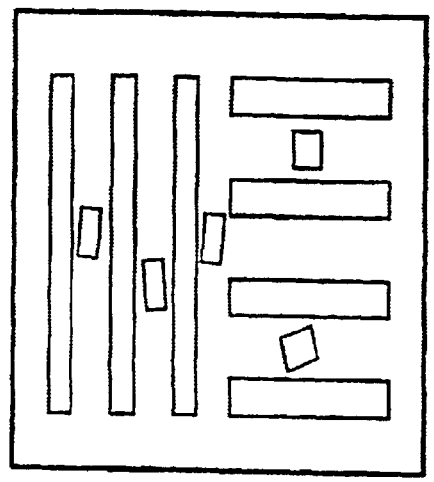
FIGS. 5A and 5B are representations, by way of example, of environments in which the inventive method is suitable to be implemented.
Figure 5B:
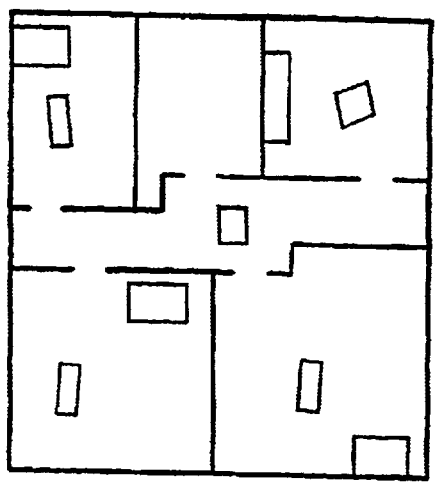

To this end the method in accordance with the invention has been implemented with the preferred algorithms used and tested in the simulation. As a test model two different environments are assumed, namely a supermarket with just one area and a series of shelves, as well as an office-like environment consisting of a plurality of areas linked to each other by a corridor with individual obstacles. This is in shown in FIG. 5, whereby FIG. 5A shows the supermarket and FIG. 5B the office. The environments were 10×15 m in size.

The robots used for the simulation were 1 m high and 0.8 m wide and were moved at a speed of 0.3 m/s. FIG. 5 shows 5 robots in the different environments in each case.

For each environment 6 simulation runs each with from 1 to 6 robots were performed. Each of the 12 simulation runs lasted for 10 min. During the simulations the robots followed randomly planned motion paths. To evaluate the simulation runs the average number of coordination connections for a robot, the number of blockings occurring and the average motion path length of the robots after each simulation run were determined.

Figure 6A:
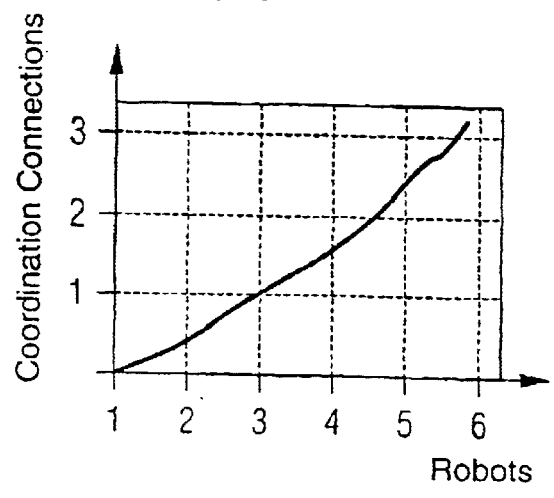
FIGS. 6A and 6B are graphs showing coordination connections versus number of robots for the environments of FIGS. 5A and 5B, respectively.
Figure 6B:
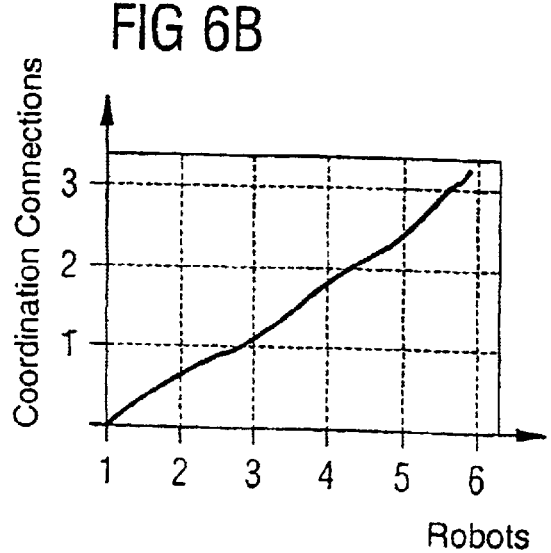

FIG. 6 shows the average number of coordination connections of a robot, with FIG. 6A showing the result for the supermarket and FIG. 6A the result for the office. As can be seen from FIG. 6, the average number of coordination connections increases almost linearly with the number of robots. The reason for this lies in the fact that the average number of coordination connections depends on the number of robots in the neighborhood of a robot and this has a linear dependence on the number of robots used.

FIG. 7 shows the number of mutual blockings of the robots. In their turn FIG. 7A shows this number for the case of the supermarket and FIG. 7B for the case of the office. It increases significantly when more than four robots are used. As can be seen from FIG. 7, in the case of two to three robots the amount of collisions in the office is two to three times greater than in the supermarket. The reason for this lies in the fact that the office features a "hot spot", namely the corridor connecting the individual rooms. This is used regularly by the robots. The influence of the corridor however declines as the number of robots increases because the probability of collisions in the individual rooms increases with increasing numbers.

Almost all blockings must have been resolved by planning new motion paths; only 3% of blockings could be resolved by simply reversing the direction of a directed coordination connection.

Finally FIG. 8 shows the average motion path length of the robots. FIG. 8A again describes the case of the supermarket and FIG. 8B that of an office. Since a robot moves at a speed of 0.3 m/s and a simulation runs for 10 minutes, a robot can move a distance of 180 meters in the best case. The actual values are however less than this since the robots must wait for one another and become involved in mutual blockings which must be resolved. As can be seen from FIG. 8, the average motion path length falls significantly when more than four robots are used.

It is evident from this simulation that the method in accordance with the invention is able to coordinate the robots, avoiding collisions and detecting and resolving blockings. The necessity to detect and resolve blockings significantly increases with the number of robots used. If more than four robots are used in the environment considered, the performance of the method drops markedly, as can be seen from the average length of movement paths.

In summary it can be established that with the method in accordance with the invention there is decentrailized coordination of the independent motion paths of a plurality of mobile robots to avoid of collisions and detect and resolve blocking groups.

This basically occurs by a combination of three algorithms which reliably resolve the problem defined. These do not use any global synchronization, do not interact with each other and need only local communication between the robots. A global coordination of a set of robots is achieved in that more than one coordination connection is possible to each robot. This networks a set of robots into a global structure.

Mutual blocking in the global coordination which cannot be avoided if only local coordination is used, will be reliably detected. The mutual blockings are resolved by reversing the direction of the coordination connections and asking robots to change their motion paths. The individual mutual blockings which cannot be resolved are those for which the units of the robots concerned planning the motion paths are not in a position to create alternate motion paths. This however only depends on the skills of the unit planning the motion path of the robot and the characteristics of the environment.

The strict separation of the planning of motion paths on the one hand and collision avoidance/handling of mutual blocking on the other hand allows the units planing the motion paths to use it entirely differently. The only restriction lies in that fact that these must be a position to plan alternate motion paths.

Naturally the invention is not restricted to the movement of mobile robots. Mobile robots in the sense of the invention can also be mobile parts of robots, for example robotic arms.

An advantageous application of the method in accordance with the invention lies in the coordination of the independent motion paths of a set of mobile robots for joint cleaning of a large area, e.g. a large supermarket, a warehouse or an airport.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for automatic, decentralized coordination of independent motion paths that are broken down into motion path segments of a plurality of mobile robots communicating with each other within a specified geographical area, to avoid collisions and to detect and resolve mutual blockings, comprising:

a robot receiving positioning information from the other robots and determining its distance ($d_{rob}$) to the other robots, when the robot moves to within a specified relative distance ($d_{safe}$) of at least one of the other robots, the robot setting up and maintaining a coordination connection to these robots to coordinate its motion path with the motion paths of the at least one other robot for as long as its distance is less than the specified relative distance, in which case one of the robots linked by the coordination connection is selected as a coordinator and the other robot is selected as a partner, the coordinator requesting the planned movement segments of the partner and initiating an algorithm for avoiding collisions, with which the motion path segments of the partner are harmonized with the motion path segments of the coordinator, in order to determine the collision areas in which the robots are less than a specified minimum distance ($d_{min}$) apart and in which a timing sequence scheme for the motion path segments of the coordinator and the partner is determined, the coordinator giving permission to itself and to the partner to execute the next motion path segment, on the basis of the timing sequence scheme for the motion path segments of the coordinator and the partner, whereby the motion path segment is executed only when the permission is granted, one of the robots initiating an algorithm to detect blocking in order to detect a group of mutually blocking robots if the detecting robot has not been granted permission to execute its next motion path segment, on detection of a group of mutually blocking robots by the detecting robot, the detecting robot initiating an algorithm to resolve the blocking, whereby the resolving algorithm comprises at least a first step and optionally a second step, wherein, in the first step, the mutually blocking robots that are connected by the coordination connection exchange the sequence for executing the next motion path segment, and in the second step, at least one of the mutually blocking robots plan new motion paths, with the second step being executed only if the first step fails to resolve the blocking.

2. The method according to claim 1, wherein the algorithm for avoiding collisions determines the time sequence scheme for the planned motion path segments of the coordinator and the partner by:

presenting the motion path segments of the coordinator and the partner in accordance with a horizontal and a vertical axis of a two-dimensional diagram, checking for positions of the robots in the motion path segments that produce a distance for the robots that is less than a specified minimum distance $d_{min}$ and marking the positions as collision areas, establishing an execution path that avoids all of the marked collision areas, beginning with a bottom left corner and ending in a top right corner of the two-dimensional diagram, dividing the execution path into linear sections, beginning with the lower left corner of the diagram, and making an entry for each linear section in the time sequence scheme, wherein for each horizontal section the coordinator, for each vertical section the partner, and for each diagonal section both the coordinator and the partner are granted permission to execute the next motion path segment.

3. The method according to claim 2, wherein the execution path for the motion path segments is established to be as short as possible.

4. The method according to claim 3, wherein the execution path established has collision paths that meet in the lowest left corner of the collision areas.

5. The method according to claim 1, wherein the algorithm to detect blocking includes:

defining a directed coordination connection such that the origin of a directed coordination connection is assigned to a waiting robot and the destination of the directed coordination connection is assigned to a priority robot, transmitting a test message along the newly defined directed coordination connection, receiving the test message from the transmitting robot and forwarding the test message to all of the receiving robot's outbound coordination connections, along with an identification of the robot forwarding the test message, receiving the forwarded test message from the forwarding robot and checking as to whether the forwarded test message originated from the robot performing the checking, and detecting a mutual blocking situation with a simultaneous identification of all robots, in the event of at least one of: (i) the test message originates from one robot, and (ii) if the test message does not originate from the one robot, the test messages are forwarded to all outbound coordination connections with the identifications.

6. The method according to claim 1, wherein the first step of the algorithm to resolve the blocking includes:

sending a change message to the group of the mutually blocking robots, receiving a change message by the robots involved in the group of mutually blocking robots and inquiring of the coordinator as to whether the sequence for executing the next motion path segment is to be swapped, discarding the change message if swapping the sequence of execution resolves the blocking, or receiving the change message by the robot initiating the change message in order to initiate the second step, and whereby the second step of the algorithm to resolve the blocking includes:

sending a replan message to the group of the mutually blocking robots, receiving the replan message by the robots involved in the group of mutually blocking robots and requesting the robot planning the motion path to plan an alternate motion path, discarding the new plan message and removing all directed coordination connections if an alternate motion path is successfully planned by the robot, or receiving the new plan message by the robot initiating the new plan message and thereupon initiating a freeing message, sending the freeing message to the group of mutually blocking robots, whereby the freeing message is enabled to leave the group, to cause all available robots to plan an alternate motion path and to register whether a robot other than the mutually blocking robots is located in the vicinity of the mutually blocking robots, receiving a freeing message by the robots initiating the freeing message, checking whether any of the mutually blocking robots can plan an alternate motion path and whether any of the mutually blocking robots registers a non-blocking robot in its vicinity, and canceling the blocking resolution if an alternate motion path is planned or a non-blocking robot is registered.

7. The method according to claim 1, wherein the mobile robots comprise robots configured to jointly clean an area.

8. The method according to claim 7, wherein the specified geographical area comprises at least one of a supermarket and an airport.

9. A method for automatic, decentralized coordination of movement paths between at least two mobile robots, which prevents collisions and detects and resolves mutual blocking situations between the mobile robots, comprising:

one of the robots receiving position information from the other of the robots;

establishing a coordinating connection between the one robot and the other robot if, according to the position information, a position between the robots falls below a predetermined minimum acceptable distance;

designating the two mobile robots as respectively either a coordinator or a partner; wherein the coordinator initiates a collision avoidance algorithm that utilizes a time sequence diagram for motion path segments of the coordinator and the partner in order to prevent a collision between the one robot and the other robot, and wherein the collision avoidance algorithm includes granting authorization by the coordinator to execute a next step in the motion path segments to at least one of the coordinator and the partner;

in the event of a failure by the collision avoidance algorithm to successfully grant the authorization, initiating an algorithm for detecting a mutual blocking situation;

if the blocking detection algorithm detects a mutual blocking situation, initiating an algorithm for resolving the blocking, including interchanging a sequence for executing the next step in the motion path between the coordinator and the partner.

10. The method according to claim 9, wherein, in the event of a failure by the interchanging to successfully resolve the mutual blocking situation, the blocking resolution algorithm replans the motion paths of the motion path segments of the time sequence diagram.

* * * * *